US012568358B2

(12) United States Patent
     Caciuloiu

(10) Patent No.: US 12,568,358 B2
(45) Date of Patent: Mar. 3, 2026

(54) PERSONAL AREA NETWORK SECURITY

(71) Applicant: NXP USA, Inc., Austin, TX (US)

(72) Inventor: Cristian Caciuloiu, Bucharest (RO)

(73) Assignee: NXP USA, Inc., Austin, TX (US)

( * ) Notice: Subject to any disclaimer, the term of this patent is extended or adjusted under 35 U.S.C. 154(b) by 66 days.

(21) Appl. No.: 18/582,947

(22) Filed: Feb. 21, 2024

(65) Prior Publication Data

US 2024/0305977 A1     Sep. 12, 2024

(30) Foreign Application Priority Data

Mar. 10, 2023    (RO) ................................ a 2023 00119

(51) Int. Cl.
     H04W 12/04        (2021.01)
     H04L 9/40         (2022.01)
     H04W 12/03        (2021.01)
     H04W 84/12        (2009.01)
     H04W 84/18        (2009.01)

(52) U.S. Cl.
     CPC ............ H04W 12/04 (2013.01); H04W 84/18 (2013.01)

(58) Field of Classification Search
     CPC ............................... H04W 12/04; H04W 84/18
     USPC .......................................................... 713/171
     See application file for complete search history.

(56) References Cited

U.S. PATENT DOCUMENTS

| | | | | | |
|---|---|---|---|---|---|
| 8,391,496 | B2 * | 3/2013 | Young | .................. | H04L 63/104 |
| | | | | | 709/219 |
| 12,335,830 | B1 * | 6/2025 | Jiang | ....................... | H04W 4/80 |

| | | | | | |
|---|---|---|---|---|---|
| 12,336,053 | B2 * | 6/2025 | Roberts | ................. | H04W 8/005 |
| 2016/0088114 | A1 * | 3/2016 | Kim | ..................... | H04L 12/2834 |
| | | | | | 709/214 |
| 2016/0295417 | A1 * | 10/2016 | Fujimoto | .............. | H04W 12/02 |
| 2016/0337327 | A1 * | 11/2016 | Borean | ................. | H04W 12/50 |
| 2017/0118636 | A1 * | 4/2017 | Zoorob | ................. | H04L 9/0866 |
| 2017/0171950 | A1 * | 6/2017 | Barna | .................. | H05B 47/199 |

(Continued)

FOREIGN PATENT DOCUMENTS

| | | | | | |
|---|---|---|---|---|---|
| CN | | 109348458 | A * | 2/2019 | ............ H04W 48/16 |

OTHER PUBLICATIONS

Gianluca Dini; Considerations on Security in ZigBee Networks; IEEE; year:2010; pp. 58-65.*

(Continued)

*Primary Examiner* — Monjur Rahim

(57)                ABSTRACT

A wireless personal area network (PAN) includes a plurality of devices configured to communicate messages encrypted with a first network key across the PAN, and the plurality of devices includes a router. The router receives from the joiner device a join request message encrypted by a second network key and sends to the joiner device a join confirmation message that contains a third network key. The router receives subsequent incoming messages from the joiner device encrypted by the third network key, re-encrypts each subsequent incoming message with the first network key, and transmits the re-encrypted subsequent incoming messages to other devices in the PAN. The router receives, from other devices in the PAN, subsequent outgoing messages for the joiner device encrypted by the first network key, re-encrypts the subsequent outgoing messages with the third network key, and sends the re-encrypted subsequent outgoing messages to the joiner device.

20 Claims, 4 Drawing Sheets

(56)        References Cited

U.S. PATENT DOCUMENTS

| | | | | |
|---|---|---|---|---|
| 2019/0014117 | A1* | 1/2019 | Li | H04W 12/06 |
| 2019/0349426 | A1* | 11/2019 | Smith | H04L 9/3239 |
| 2021/0068198 | A1* | 3/2021 | Michielsen | H04W 84/18 |
| 2023/0379683 | A1* | 11/2023 | Roberts | H04W 76/14 |

OTHER PUBLICATIONS

Fan et al.: "Security Analysis of Zigbee," May 18, 2017, pp. 1-18.
Hoceini et al.: "A New Key Management and Authentication Architecture for ZigBee Networks (KAAZ)," Int'l Conf. Security and Management, SAM'17, ISBN: 1-60132-467-7, CSREA Press, pp. 39-45.
Zhu et al.: "LEAP+: Efficient Security Mechanisms for Large-Scale Distributed Sensor Networks," ACM Journal Name, vol. V, No. N, Month 20YY, pp. 1-28.

* cited by examiner

PERSONAL AREA NETWORK SECURITY

CROSS-REFERENCE TO RELATED APPLICATIONS

This application claims the priority under 35 U.S.C. § 119 of Romania application no. A202300119, filed on 10 Mar. 2023, the contents of which are incorporated by reference herein.

FIELD

The disclosure relates to a method and a router for securely connecting a device to a wireless personal area network.

BACKGROUND

A personal area network (PAN) is a computer network for interconnecting electronic devices within an individual person's workspace. This type of network is designed to enable devices within the PAN to communicate and share resources between each other or connect to a higher-level network via a master device acting as a gateway. PANs typically consist of devices such as smartphones, tablets, wearables and printers. An example protocol for creating a PAN is known as Zigbee. Zigbee is an IEEE 802.15.4-based specification for a suite of high-level communication protocols used to create PANs with small, low-power digital radios, such as for home automation, medical device data collection, and other low-power low-bandwidth needs.

In the legacy Zigbee home automation specification, a well-known encryption key (ZBA09 key) was defined. The specification allows an end device that has lost network credentials to automatically request a rejoin. This rejoin is insecure because the network key may be provided to the joiner device encrypted only with the well-known ZBA09 key. This process makes it very straightforward for eavesdroppers to obtain the active network key. The connectivity standards alliance (CSA) now discourages the use of well-known encryption keys but manufacturers have many legacy devices that abide by the legacy specification.

SUMMARY

According to a first aspect there is provided a method of connecting a joiner device to a wireless personal area network (PAN), the PAN comprising a plurality of devices configured to communicate messages encrypted with a first network key across the PAN, the plurality of devices comprising a router, the method comprising:

i) receiving by the router from the joiner device a join request message encrypted by a second network key;

ii) sending by the router to the joiner device a join confirmation message that contains a third network key;

iii) receiving subsequent incoming messages by the router from the joiner device encrypted by the third network key, re-encrypting by the router each subsequent incoming message with the first network key and transmitting the re-encrypted subsequent incoming messages to other devices in the PAN; and iv) receiving by the router from other devices in the PAN subsequent outgoing messages for the joiner device encrypted by the first network key, re-encrypting the subsequent outgoing messages with the third network key and sending the re-encrypted subsequent outgoing messages by the router to the joiner device.

An advantage of the method is that a re-joiner device using an outdated or retired network key (the second network key) can be allowed to rejoin the PAN by using a proxy connection via the router using a separate key (the third network key) to the current active network key (the first network key). The current active network key is therefore protected from being leaked out of the PAN to a potentially insecure device.

The join confirmation message containing the third network key may be encrypted by the second network key.

The plurality of devices may comprise a co-ordinator configured to generate the first network key and distribute the first network key to the plurality of devices of the PAN.

The method may further comprise:

ia) sending by the router an update device command encrypted by the first network key to the co-ordinator informing the co-ordinator of the join request message.

The method may further comprise:

iib) the router waiting for a timeout period to receive a join confirmation message from the co-ordinator.

The method may alternatively further comprise:

iib) the router receiving an error code from the coordinator in response to the coordinator receiving the update device command.

The plurality of devices may each be configured to communicate messages containing a common PAN identifier.

The router and the joiner device may be configured to communicate messages that contain the common PAN identifier.

The PAN may be a network according to IEEE standard 802.15.4.

The PAN may be a Zigbee PAN, the joiner device a Zigbee end device and the router a Zigbee router.

The third network key may be unique to the joiner device.

The method may further comprise:

the router sending the first network key to the joiner device encrypted with the third network key; and the joiner device sending subsequent messages to the router encrypted with the first network key.

According to a second aspect there is provided a router for a wireless personal area network (PAN), the PAN comprising a plurality of devices configured to communicate messages encrypted with a first network key across the PAN, the router configured to:

receive from a joiner device a join request message encrypted by a second network key;

send to the joiner device a join confirmation message that contains a third network key;

receive subsequent incoming messages from the joiner device encrypted by the third network key;

re-encrypt each subsequent incoming message with the first network key and transmit the re-encrypted subsequent incoming messages to other devices in the PAN;

receive from other devices in the PAN subsequent outgoing messages for the joiner device encrypted by the first network key; and re-encrypt the subsequent outgoing messages with the third network key and send the re-encrypted subsequent outgoing messages to the joiner device.

The router may be further configured to:

send an update device command encrypted by the first network key to a co-ordinator of the PAN informing the co-ordinator of the join request message.

The router may be further configured to:

wait for a timeout period to receive a join confirmation message from the co-ordinator; or receive an error code from the coordinator, before sending the join confirmation message to the joiner device.

The router may be configured to send messages to and receive messages from the coordinator and the joiner device that contain a common PAN identifier.

The PAN may be a network according to IEEE standard 802.15.4.

The router may be a Zigbee router.

The router may be configured to connect to a plurality of joiner devices and generate a unique third network key for each joiner device.

The router may be further configured to:

send the first network key to the joiner device encrypted with the third network key; and receive subsequent messages from the joiner device encrypted with the first network key.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which.

Figure 1:
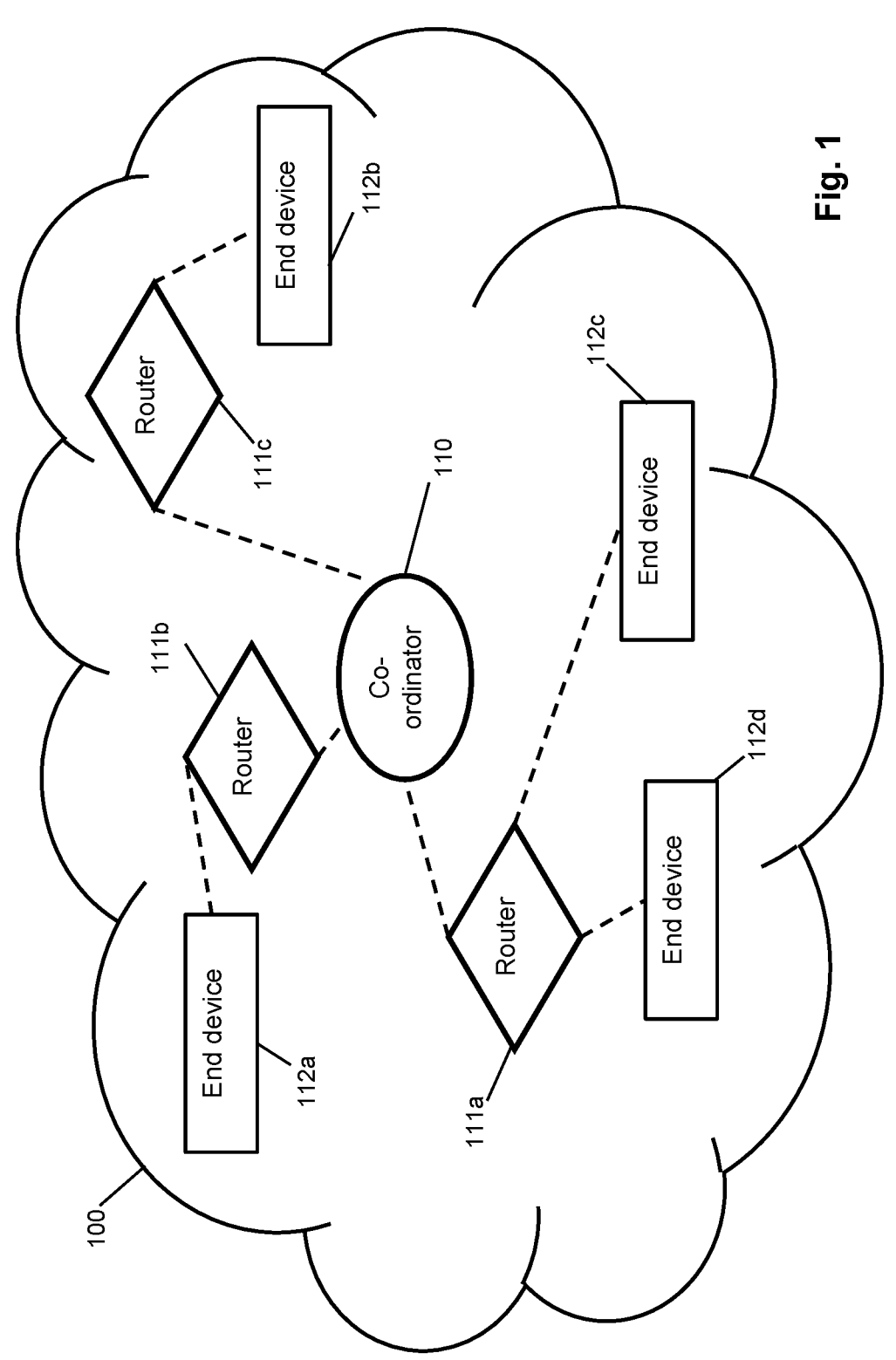
FIG. 1 is a schematic diagram of an example PAN.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar features in modified and different embodiments.

DETAILED DESCRIPTION OF EMBODIMENTS

A schematic diagram of an example PAN 100 is shown in FIG. 1. The PAN 100 comprises a plurality of devices including a co-ordinator 110, a plurality of routers 111a-c and a plurality of end devices 112a-d. The PAN may be a network according to IEEE 802.15.4. The co-ordinator 110 is responsible for managing the overall network, and typically functions as a 'trust center' for providing security control of the network. The plurality of routers 111a-c each act as an intermediary between the co-ordinator 110 and their respective end device 112a-d (indicated by the dashed lines). The routers 111a-c are configured to route traffic between the co-ordinator 110 and the end devices 112a-d as well as to transmit and receive data themselves. The end devices 112a-d are devices that perform a function such as a motion sensor or smart light bulb. The end devices 112a-d cannot themselves route traffic between any other device and are typically low-power devices that may be battery powered. The end devices 112a-d can only communicate to the rest of the PAN 100 via their parent router 111a-c (indicated by the dashed lines). The end devices 112a-d may each be a Zigbee end device and the plurality of routers 111a-c may each be a Zigbee router. The co-ordinator 110 may be a Zigbee co-ordinator.

In some circumstances, an end device 112a-d may lose network credentials, for example if the end device misses a network update from the co-ordinator 110. If this happens, the end device may send a request to rejoin the network. Encryption at various stages of the rejoin process is possible at two levels: the application, or application support (APS), layer and the network layer. The network layer deals with network functions such as connecting, disconnecting and setting up networks. Encryption at the network layer level requires an active network key, which is a key shared by all devices on the network 100. The active network key allows for secure communication over the PAN 100 between devices possessing the active network key. All devices that are authorized to join the network have a copy of the active network key and use the active network key to encrypt and decrypt all network messages. The co-ordinator 110, acting as the trust center, generates the active network key and distributes it to the plurality of routers 111a-c and the plurality of end devices 112a-d of the PAN 100. The co-ordinator 100 may periodically update and switch to a new active network key to maintain security of the PAN 100.

The application layer, sitting above the network layer, acts as a bridge between the network layer and the application layer. The application layer is the highest-level layer defined by the Zigbee specification and acts as an interface of the Zigbee system to end users. Application layer level security involves the use of link keys. Link keys can be well-known encryption keys such as the ZBA09 key or they can be unique. A trust center link key (TCLK) allows a device to communicate with the co-ordinator 110 acting as the trust center via APS command messages.

Figure 2:
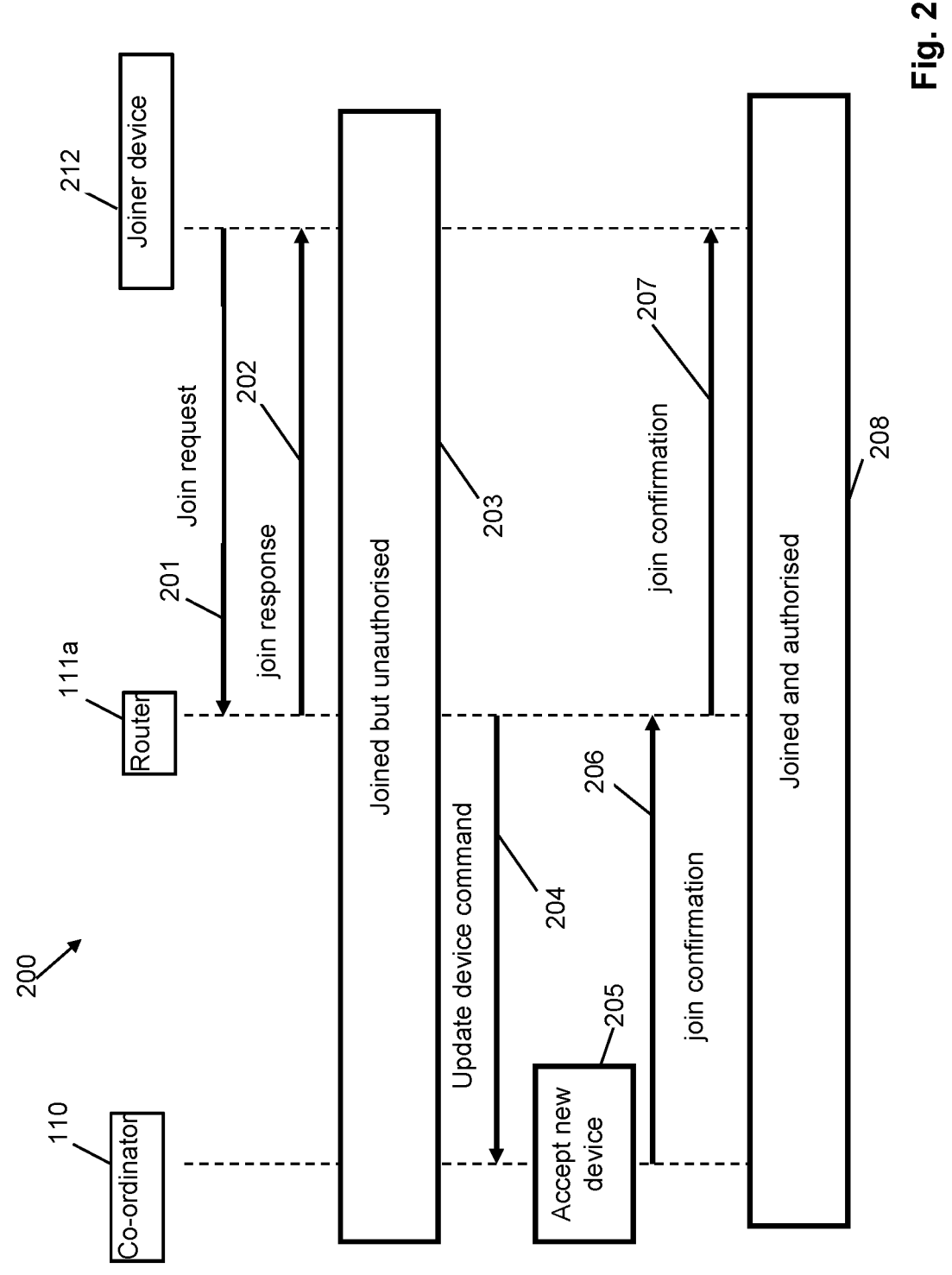
FIG. 2 is a process flow diagram for connecting a joiner device to a PAN.

An example rejoining process 200 according to the R22 Zigbee specification is illustrated in FIG. 2. The rejoining process 200 is between a joiner device 212 and the PAN 100 comprising a plurality of devices including the co-ordinator 110 and a router 111a from the plurality of routers 111a-d of FIG. 1. Each of the plurality of devices in the PAN is configured to communicate messages encrypted with a first network key, i.e. the current active network key, across the PAN 100. To initiate the rejoining process, the router 111a receives from the joiner device 212 a join request message 201, which is encrypted by a second network key, i.e. a key that is different to the first network key. The second network key is one that was used previously by the PAN 100 to encrypt messages between devices within the PAN 100 but has since been superseded (making the second network key a retired network key).

The router 111a accepts the join request by sending a network join response message 202 to the joiner device 212, which is also encrypted by the second network key. This allows the joiner device 212 to transition to a 'joined but unauthorized' state 203. The router 111a may alternatively reject the join request with the second network key, for example if the router 111a does not recognise the second network key. The joiner device 212 may then send a further join request without encryption.

The router 111a then sends an update device command message 204 to the co-ordinator 110, which informs the co-ordinator 110 of the join request message 201. The update device command message 204 is encrypted by the first network key (the current active network key) and is also encrypted at the application layer.

The co-ordinator 110 can then either deny or accept the rejoin request. If the co-ordinator 110 accepts 205 the rejoin request, the co-ordinator 110 sends a join confirmation message 206, which contains the first network key, to the router 111a. This is encrypted by the first network key and is also encrypted at the application layer. The join confirmation message 206 may be in the form of an APS tunnel command that contains an APS encrypted transport key, the command being encrypted by the active network key (NWK).

The join confirmation message 206 from the trust centre 110 is then relayed from the router 111*a* to the joiner device 112 in a further join confirmation message 207, which is encrypted only at the application layer. The joiner device 112 then decrypts the join confirmation message 206 using the APS level link key and obtains the first network key (the active network key). This allows the joiner device 212 to transition to the joined and authorized state 208. The joiner device 212 can then communicate with the plurality of devices in the PAN via its parent router 111*a* using the active network key.

A problem with the above sequence of operations arises when sending the further join confirmation message 207 to the joiner device 112. Between the router 111*a* and the joiner device 212, the join confirmation message 207 is unencrypted at the network layer. If the message 207 is APS level encrypted with a well-known link key, an attacker can receive the packet over the air, decrypt it and learn the active network key. An attacker can then use the active network key to infiltrate other devices 112*a-d* on the PAN, compromising its security. The Connectivity Standards Alliance (CSA) plans to ban the use of the above type of rejoining process in revisions to the specification for new device certifications.

The Zigbee R22.2 specification presents a modification to the above rejoining procedure 200, in that the co-ordinator 110 will no longer send a join confirmation message 206 with the active network key if the joiner device 212 has not previously acquired a unique APS level TCLK from the co-ordinator 110. In this case, the joiner device 112 will not succeed in rejoining and will be required to undergo full commissioning, joining the PAN 100 as a device new to the network. This may require user authorization or a manufacturer specific operation, such as pressing a hidden button or opening the device 112.

To address the above problem, either the software on a joiner device can be upgraded or all legacy devices that do not receive a unique TCLK after they are commissioned into the network can be retired. These options can be expensive or undesirable. A manufacturer may desire backwards compatibility, such that new Zigbee devices abiding by the R22.2/R23 specification can be used together with older Zigbee devices to reduce costs.

Figure 3:
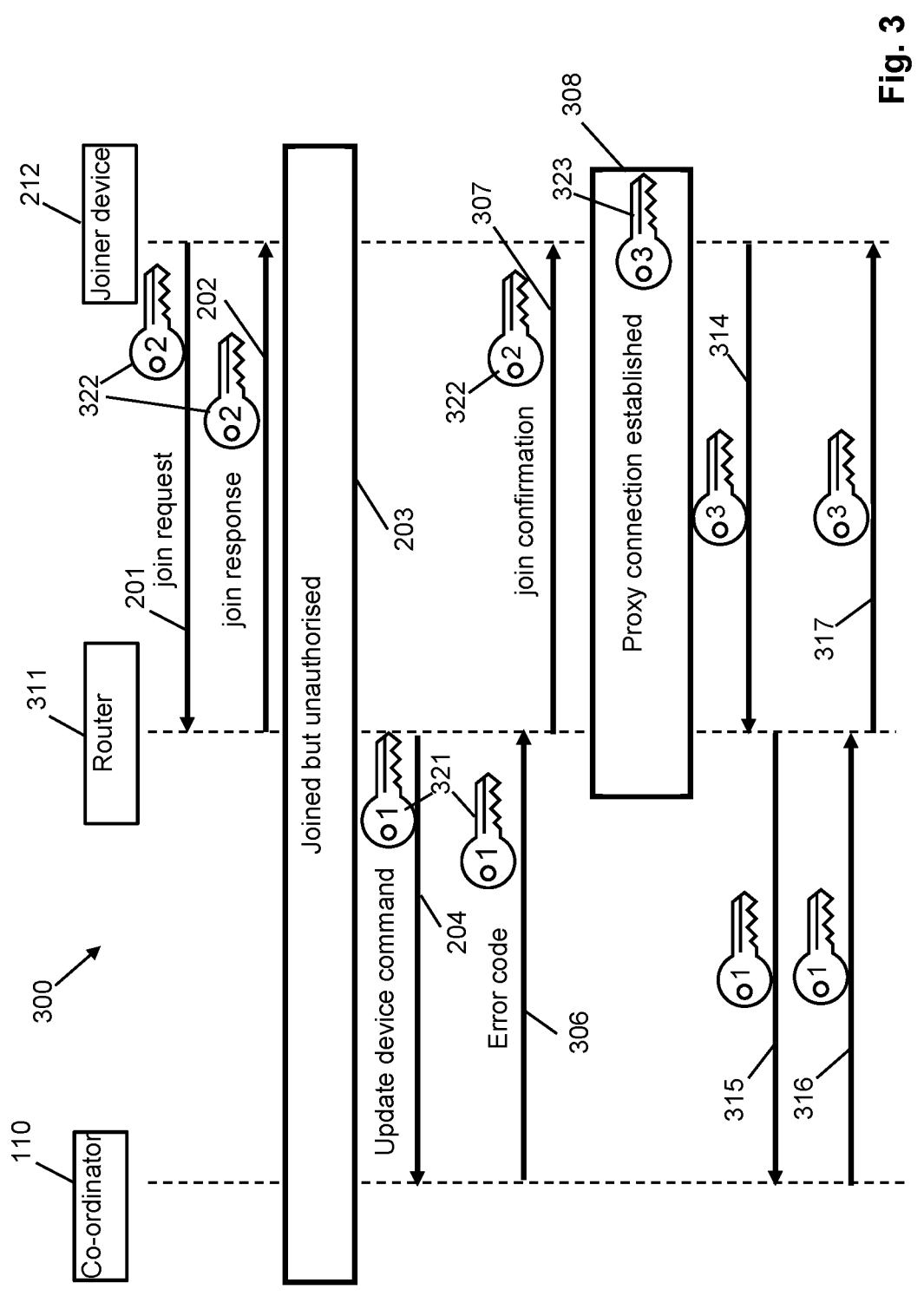
FIG. 3 is a further process flow diagram for connecting a joiner device to a PAN.

FIG. 3 is a process flow diagram 300 detailed a process for connecting a joiner device 212 to a wireless PAN. The PAN may be the PAN 100 of FIG. 1. The process flow diagram 300 is shown for a connection between the joiner device 212 of FIG. 2 and a PAN comprising a plurality of devices including a router 311. Similar to that of FIG. 2, each of the plurality of devices of the PAN is configured to communicate messages encrypted with a first network key (the active network key) across the PAN.

In a similar manner to the process of FIG. 2, the router 311 receives from the joiner device 212 a join request message 201 encrypted by a second network key 322 (e.g. a retired or outdated network key). The router 311 has access to a list of previous keys that includes the second network key 322, which differs from the current first network key. As before, the router 311 accepts the join request by sending a network join response message 202 to the joiner device 212, which is also encrypted by the second network key 322. This allows the joiner device 212 to transition to a 'joined but unauthorized' state 203. If, however, the router 311 does not recognise the second network key 322 the join request from the joiner device 212 is rejected and is not responded to by the router 311. The joiner device 212 may then switch to using an unsecured Trust Center Rejoin process, which is disclosed in the ZigBee Specification revision R17 and subsequent versions. Following this process, the router sends a join response 202 to the joiner device 212 that is unencrypted.

If the join response 202 is sent to the joiner device, the router 311 then sends an update device command message 204 to the co-ordinator 110, which informs the co-ordinator 110 of the join request message 201. The update device command message 204 is encrypted by the first network key 321 (i.e. the current active network key) and is also encrypted at the application layer. The co-ordinator 110 determines that the joiner device 212 wishes to use the active network key but has not previously requested a unique Trust Center Link Key. To prevent security vulnerabilities, the co-ordinator 110 either responds with an error code message 306 or does not respond at all. The router 311 may check for a response from the co-ordinator 110 or may wait until the end of a timeout period. If either the error code message 306 is received or if the timeout period expires, the router 311 sends to the joiner device 212 a join confirmation message 307, which is encrypted by the second network key 322. The join confirmation message 307 is encrypted at the application layer and may be unencrypted at the network layer. Instead of the join confirmation message containing the first network key 321 (i.e. the current active network key), the join confirmation message 307 contains a third network key 323. The third network key 323 is a unique network key, i.e. different to the first and second network keys 321, 322. The third network key 323 is then used only for communication between the router 311 and the joiner device 212. The effect of this process is that the joiner device 212 is able to connect to the PAN using the router 311 as a proxy connection and the active network key 321 is not leaked from the PAN.

A proxy connection 308 is then established between the router 311 and the joiner device 212 using the third network key 323. This allows the router 311, on receiving subsequent incoming messages 314 from the joiner device 212 encrypted by the third network key, to re-encrypt each subsequent incoming message with the first network key and transmit the re-encrypted messages 315 to other devices in the PAN. This also allows the router 311 to, on receiving subsequent outgoing messages 316 for the joiner device 212 that are encrypted by the first network key 321, re-encrypt the messages with the third network key 323 and send the re-encrypted outgoing messages 317 to the joiner device 212.

The proxy connection 308 thereby allows the joiner device 212 to access the PAN through its parent proxy router 311 via the re-encryption process outlined above. The proxy connection is the only routing point from the joiner device 212 to the plurality of devices of the PAN. The router 311 may be identical from a hardware perspective to each of the routers of the plurality of routers 111*a*-111*c* but with additional functionality programmed as an additional stack in the Zigbee architecture or implemented via functions from the Zigbee cluster library (ZCL).

As mentioned above, in accordance with the Zigbee R22.2 specification, the co-ordinator 110 will not send a join confirmation message containing the first network key 321 to the router 311 if the joiner device 212 has not previously acquired an APS level TCLK from the co-ordinator 110.

The router 311 may function as a proxy router for multiple joining devices 212, and may be configured to track which of the joining devices 212 have not previously acquired an APS level TCLK and designate them as requiring a proxy connection to the PAN.

Figure 4:
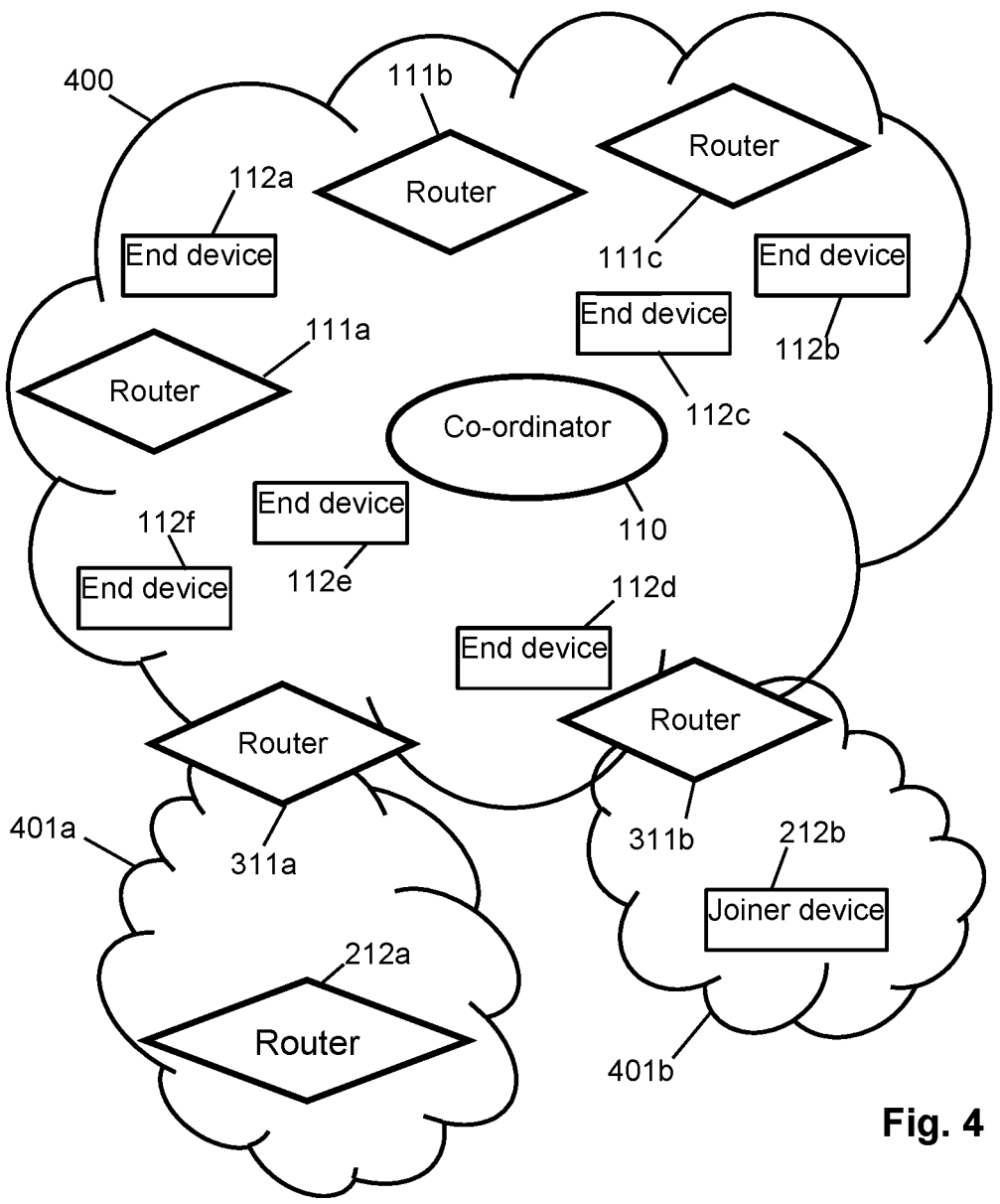
FIG. 4 is an example PAN and two example network sub-areas.

FIG. 4 is a schematic diagram of an example PAN 400 with first and second network sub-areas 401*a*, 401*b* created by routers 311*a*, 311*b* acting as proxies for joiner devices 212*a*, 212*b*. The PAN 400 comprises a plurality of devices including a co-ordinator 110, a plurality of routers 111*a-c* and a plurality of end devices 112*a-f*, all of which communicate using an active network key maintained by the co-ordinator device 110.

The first router 311*a* and first joiner device 212*a* form the first network sub-area 401*a*. The second router 311*b* and second joiner device 212*b* form the second network sub-area 401*b*. The joiner devices 212*a*, 212*b* may be either an end device or a router. In the case of FIG. 4, the first joiner device 212*a* is a router and the second joiner device 212*b* is an end device.

First and second proxy routers 311*a*, 311*b* are configured to connect their respective joiner device 212*a*, 212*b* to the PAN 400 using the process outlined in FIG. 3. This allows the first and second joiner devices 212*a*, 212*b* to communicate with any one of the plurality of devices of the PAN 400 via the respective proxy router 311*a*, 311*b* without compromising the security of the PAN 400. Each proxy router 311*a*, 311*b* may connect a plurality of joiner devices 212*a*, 212*b* to the PAN 400, and may connect a mixture of proxy connected devices and authorised devices to the PAN 400. As described above, the first and second proxy routers 311*a*, 311*b* generate a unique network key for each joiner device 212*a*, 212*b* that it connects to the PAN 400. The plurality of other routers 111*a-c* may be functionally identical to the first and second proxy routers 311*a-b*, the difference being the plurality of end devices 112*a-f* governed by the plurality of routers 111*a-c* do not require the proxy connection 308 of FIG. 3 and are therefore connected in the PAN with the first network key maintained by the co-ordinator device 110.

The PAN 400 may have a unique PAN identifier (PAN ID) common to each of the plurality of devices on the PAN 400. The first and second network sub-areas 401*a*, 401*b* may also have the same PAN ID as the PAN. This means that any incoming or outgoing messages sent between the first and second joiner device 212*a*, 212*b* and their respective first and second proxy routers 311*a*, 311*b* are sent with the same PAN ID as messages sent over the PAN 400. The first and second proxy routers 311*a*, 311*b* may also perform PAN ID updates on their respective first and second joiner devices 212*a*, 212*b* to ensure that the first and second joiner devices 212*a*, 212*b* can still send and receive message from the plurality of devices in the PAN 400 after an update made by the co-ordinator 110.

The first and second network sub-areas 401*a*, 401*b* may alternatively be assigned a different PAN ID to that of the PAN 400. The first and second proxy routers 311*a*, 311*b* may be configured to translate the PAN ID of incoming messages from the first and second joiner device 212*a*, 212*b* to the router 311*a*, 311*b* from the PAN ID of the respective first and second network sub-areas 401*a*, 401*b* to the PAN ID of the PAN 400. The first and second proxy routers 311*a*, 311*b* may be configured to translate the PAN ID of outgoing messages from other devices in the PAN 400 to either of the first or second joiner devices 212*a*, 212*b* from the PAN ID of the PAN 400 to the PAN ID of the respective first and second network sub-areas 401*a*, 401*b*.

If the first and second proxy routers 311*a*, 311 are Zigbee routers, then incorporating the proxy connection 308 will provide first and second joiner devices 212*a*, 212*b* with Zigbee services that, even if eavesdropped, would not compromise the security of the PAN 400 that is governed by the first network key. This helps ensure that the security of the wider network created by the PAN 400 and first and second network sub-areas 401*a*, 401*b* is not degraded by the weaker security of the first and second network sub areas 401*a*, 401*b*.

The first and second proxy routers 311*a*, 311*b* may generate a link status message, the link status message containing a measure of the quality of the connection between the first and second joiner devices 212*a*, 212*b* and their respective first and second routers 311*a*, 311*b*. The quality of the connection may be measured, for example by the received signal strength indication (RSSI), signal to noise ratio (SNR) or bit error rate (BER). The first and second proxy routers 311*a*, 311*b* may broadcast the link status message encrypted with the third network key to any neighbouring devices in the respective first and second network sub-areas 401*a*, 401*b*.

As mentioned in the background, in the R22.2 Zigbee specification the joining device requires a unique TCLK. The first and second proxy routers 311*a*, 311*b* may maintain the proxy connection with their respective first and second joiner devices 212*a*, 212*b* whilst this unique TCLK is being obtained by the first and second joiner devices 212*a*, 212*b*. Once the first and second joiner devices 212*a*, 212*b* have acquired their unique TCLKs they can be provided with the first network key and communicate on the PAN 400 in the same manner as any of the devices in the plurality of devices that comprise the PAN 400. If the first and second joiner devices 212*a*, 212*b* fail to obtain a unique TCLK then they may continue to communicate with devices in the PAN 400 via the proxy connection 308 of FIG. 3. In a general aspect therefore, the router 311*a*, 311*b* may send the first network key to the joiner device 212*a*, 212*b* encrypted with the third network key and the joiner device 212*a*, 212*b* then sends subsequent messages to the router 311*a*, 311*b* encrypted with the first network key.

From reading the present disclosure, other variations and modifications will be apparent to the skilled person. Such variations and modifications may involve equivalent and other features which are already known in the art of personal area networks, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A method of connecting a joiner device to a wireless personal area network (PAN), the PAN comprising a plurality of devices configured to communicate messages encrypted with a first network key across the PAN, the plurality of devices comprising a router, the method comprising:

i) receiving by the router from the joiner device a join request message encrypted by a second network key;

ii) sending by the router to the joiner device a join confirmation message that contains a third network key, wherein the third network key is different from the first and second network keys and unique to the joiner device;

iii) receiving subsequent incoming messages by the router from the joiner device encrypted by the third network key, re-encrypting by the router each subsequent incoming message with the first network key and transmitting the re-encrypted subsequent incoming messages to other devices in the PAN; and iv) receiving by the router from other devices in the PAN subsequent outgoing messages for the joiner device encrypted by the first network key, re-encrypting the subsequent outgoing messages with the third network key and sending the re-encrypted subsequent outgoing messages by the router to the joiner device.

2. The method of claim 1, wherein the plurality of devices comprises a co-ordinator configured to generate the first network key and distribute the first network key to the plurality of devices of the PAN.

3. The method of claim 2, further comprising:

ia) sending by the router an update device command encrypted by the first network key to the co-ordinator informing the co-ordinator of the join request message.

4. The method of claim 3, further comprising:

iib) the router waiting for a timeout period to receive a join confirmation message from the co-ordinator.

5. The method of claim 3, further comprising:

iib) prior to sending the joiner confirmation message containing the third network key, the router receiving an error code from the coordinator in response to the coordinator receiving the update device command.

6. The method of claim 1, wherein the plurality of devices are each configured to communicate messages containing a common PAN identifier.

7. The method of claim 6, wherein the router and the joiner device are configured to communicate messages that contain the common PAN identifier.

8. The method of claim 1, wherein the PAN is a network according to IEEE standard 802.15.4.

9. The method of claim 8 wherein PAN is a Zigbee PAN, the joiner device is a Zigbee end device and the router is a Zigbee router.

10. The method of claim 3, further comprising:

the router either waiting for expiration of a timeout period or receiving an error code from the co-ordinator in response to the update device command prior to the sending the join confirmation message that contains the third network key.

11. A router for a wireless personal area network (PAN), the PAN comprising a plurality of devices configured to communicate messages encrypted with a first network key across the PAN, the router configured to:

receive from a joiner device a join request message encrypted by a second network key;

send to the joiner device a join confirmation message that contains a third network key, wherein the third network key is different from the first and second network keys and unique to the joiner device;

receive subsequent incoming messages from the joiner device encrypted by the third network key;

re-encrypt each subsequent incoming message with the first network key and transmit the re-encrypted subsequent incoming messages to other devices in the PAN;

receive from other devices in the PAN subsequent outgoing messages for the joiner device encrypted by the first network key; and re-encrypt the subsequent outgoing messages with the third network key and send the re-encrypted subsequent outgoing messages to the joiner device.

12. The router of claim 11, wherein the router is further configured to:

send an update device command encrypted by the first network key to a co-ordinator of the PAN informing the co-ordinator of the join request message.

13. The router of claim 12, wherein the router is further configured to:

wait for a timeout period to receive a join confirmation message from the co-ordinator before sending the join confirmation message to the joiner device.

14. The router of claim 11, wherein the router is a Zigbee router.

15. The router of claim 11, wherein the router is configured to connect to a plurality of joiner devices and generate a unique third network key (323) for each joiner device.

16. The router of claim 12, wherein the router is further configured to:

receive an error code from the coordinator before sending the join confirmation message to the joiner device.

17. The router of claim 11, wherein the PAN is a network according to IEEE standard 802.15.4.

18. The router of claim 12, wherein the router is configured to send messages to and receive messages from the coordinator and the joiner device that contain a common PAN identifier.

19. The router of claim 11, wherein the router is configured to:

send the first network key to the joiner device encrypted with the third network key; and receive subsequent messages from the joiner device encrypted with the first network key.

20. The method of claim 1, further comprising:

the router sending the first network key to the joiner device encrypted with the third network key; and the joiner device sending subsequent messages to the router encrypted with the first network key.

* * * * *